United States Patent
Miller et al.

(10) Patent No.: US 8,037,915 B2
(45) Date of Patent: Oct. 18, 2011

(54) METHOD AND APPARATUS FOR FORMING INSULATED ROTOR CONDUCTORS

(75) Inventors: Mark L Miller, Charlotte, NC (US);
William F Jones, York, SC (US); Mark A Williams, Landrum, SC (US); Steve Castleberry, Greer, SC (US); Rick Angell, Simpsonville, SC (US)

(73) Assignee: Siemens Energy, Inc., Orlando, FL (US)

( * ) Notice: Subject to any disclaimer, the term of this patent is extended or adjusted under 35 U.S.C. 154(b) by 209 days.

(21) Appl. No.: 12/031,074

(22) Filed: Feb. 14, 2008

(65) Prior Publication Data

US 2009/0078369 A1 Mar. 26, 2009

Related U.S. Application Data

(60) Provisional application No. 60/973,857, filed on Sep. 20, 2007.

(51) Int. Cl.
*H02K 15/10* (2006.01)
(52) U.S. Cl. .......... 156/381; 156/52; 156/538; 156/572; 29/825
(58) Field of Classification Search .......... 156/570, 156/573, 538, 49, 51, 52, 381, 498; 29/825, 29/829
See application file for complete search history.

(56) References Cited

U.S. PATENT DOCUMENTS

| | | | |
|---|---|---|---|
| 3,774,299 A * | 11/1973 | Sato et al. | 29/611 |
| 3,881,907 A * | 5/1975 | Starr | 65/114 |
| 3,915,203 A * | 10/1975 | Solomon | 140/87 |
| 4,263,475 A | 4/1981 | McNeal | |
| 4,364,551 A * | 12/1982 | Rutishauser | 271/121 |
| 4,385,685 A * | 5/1983 | Sticht | 198/341.01 |
| 4,389,584 A | 6/1983 | Burns | |
| 5,099,159 A | 3/1992 | Liptak et al. | |
| 5,164,142 A | 11/1992 | Simmonds | |
| 6,387,184 B1 * | 5/2002 | Gibson et al. | 118/323 |
| 6,498,415 B1 | 12/2002 | Emery | |
| 6,585,837 B1 | 7/2003 | Keil et al. | |
| 6,663,740 B2 * | 12/2003 | Yamasaki | 156/248 |
| 6,768,240 B2 | 7/2004 | Younsi et al. | |
| 2002/0059976 A1 * | 5/2002 | Taggart | 156/177 |
| 2003/0083768 A1 * | 5/2003 | Duemler | 700/108 |

FOREIGN PATENT DOCUMENTS

| | | |
|---|---|---|
| GB | 1031084 | 5/1966 |
| JP | 52038101 A | 3/1977 |
| JP | 2001008419 A | 1/2001 |
| WO | 0148895 A1 | 7/2001 |

* cited by examiner

*Primary Examiner* — Richard Crispino
*Assistant Examiner* — Martin Rogers (57) ABSTRACT

An apparatus is disclosed for forming an insulated rotor conductor by bonding an insulating material onto a single side of a flat electrical conductor under controlled heat and mechanical pressure. The rotor conductor is suitable for assembly into the rotor assembly of a rotating electrical machine such as an alternating current generator. The apparatus includes modules to facilitate easy relocation within a manufacturing environment and to make efficient use of available manufacturing space. A corresponding method is also disclosed.

13 Claims, 7 Drawing Sheets

METHOD AND APPARATUS FOR FORMING INSULATED ROTOR CONDUCTORS

This application claims benefit of the 20 Sep. 2007 filing date of U.S. provisional patent application 60/973,857.

FIELD OF THE INVENTION

The present invention relates to an apparatus for bonding an insulating material to a flat electrical conductor and, more specifically, to a modular apparatus for forming an insulated rotor conductor for use in the rotor assembly of a rotating electrical machine.

BACKGROUND OF THE INVENTION

Alternating current generators for use in electrical power generating facilities comprise one or more stator coils surrounding a generally cylindrical-shaped rotor assembly attached to a rotating shaft. The rotor assembly comprises a plurality of electrical conductors arranged into a coil about the shaft. Excitation of the rotor coil by an electrical current creates a magnetic field about the rotor assembly. A prime mover such as a steam or gas turbine engine connected to the rotor shaft causes the rotor assembly and the surrounding magnetic field to rotate within the stator assembly, inducing an alternating current to flow in the stationary stator coils. The power thus generated is distributed to consumers connected to a corresponding transmission and distribution network.

Manufacturers of large rotating electrical machines such as alternating current generators for production of electrical power produce such equipment in various capacities and physical sizes. The rotor assemblies of these machines conventionally comprise a plurality of electrical conductors made of substantially straight and flat copper straps that are insulated on at least one side. Because rotor assemblies are produced in a plurality of physical sizes for use in the various capacity machines, rotor conductors having various predetermined lengths, widths and thicknesses are utilized. For example, rotor conductors for use in alternating current generators for utility applications may be fabricated from copper straps having thicknesses within a range of from about 0.1 inch to about 0.5 inch, widths within a range of from about 0.8 inch to about 2.0 inches and lengths within a range of from about 10 feet to about 30 feet.

Because the rotating machines are themselves produced in low volume, often one at a time, the rotor conductors are typically produced in small lot sizes. These small lots are often fabricated largely by hand in labor intensive batch processing operations resulting in inefficient use of labor and facilities. For example, application of the insulation to the copper straps by hand often results in costly repeated handling of work pieces and makes inefficient use of the limited space in the manufacturing facility due to the length of the conductors.

SUMMARY OF THE INVENTION

In accordance with one aspect of the invention, an apparatus is provided for forming insulated rotor conductors comprising a flat electrical conductor having a layer of insulating material bonded thereto. The apparatus comprises a plurality of modules detachably attached to each other for conveying the layer of insulating material and individual ones of the electrical conductors in a process direction through the modules. The modules comprise an infeed module, a bonding module and a collection module. The infeed module supplies individual ones of the electrical conductors from a stack of electrical conductors to a predetermined first position in the infeed module. The bonding module is located adjacent to the infeed module and is provided for bonding a layer of the insulating material to the electrical conductors to form a solid unitary structure defining the insulated rotor conductors. The bonding module comprises a heating chamber enclosing a heating device for heating the electrical conductors and the layer of insulating material to a predetermined temperature to thereby bond the layer of insulating material to the individual electrical conductors, an infeed opening formed in a side of the heating chamber and aligned with the first position for receiving the electrical conductors and the layer of the insulating material in the process direction, and an exit opening formed in a side of the heating chamber opposite and aligned with the infeed opening for discharging the insulated rotor conductors from the bonding module. The collection module is located downstream from the bonding module in the process direction for receiving the insulated rotor conductors. The collection module includes a collection reservoir for receiving a plurality of the insulated rotor conductors in vertically stacked relation.

In accordance with another aspect of the invention, a method is provided for forming an insulated rotor conductor comprising a flat electrical conductor having a layer of insulating material bonded thereto in an apparatus comprising a plurality of modules detachably attached to each other for conveying the layer of insulating material and individual ones of the electrical conductors in a process direction through the modules. The method comprises the steps of providing a plurality of the electrical conductors on an infeed module, providing a layer of insulating material to individual ones of the electrical conductors on the infeed module, conveying each of the electrical conductors having a layer of insulating material from the infeed module to a bonding module located adjacent to the infeed module, heating each of the electrical conductors having a layer of insulating material within the bonding module to activate a heat activated adhesive on a surface of the insulating material to bond the layer of insulating material to the electrical conductor, forming an insulated rotor conductor; and conveying each of the insulated rotor conductors from the bonding module to a collection module, where a plurality of the insulated rotor conductors are stored.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

The present invention provides a method and a modular production apparatus for applying insulation to at least one side of a flat electrical conductor. The apparatus is configurable to produce insulated rotor conductors having various predetermined thicknesses, widths and lengths. The modular apparatus is easily assembled for production and disassembled for transport, maintenance and/or modification and sized to make efficient use of available manufacturing space.

Figure 1:
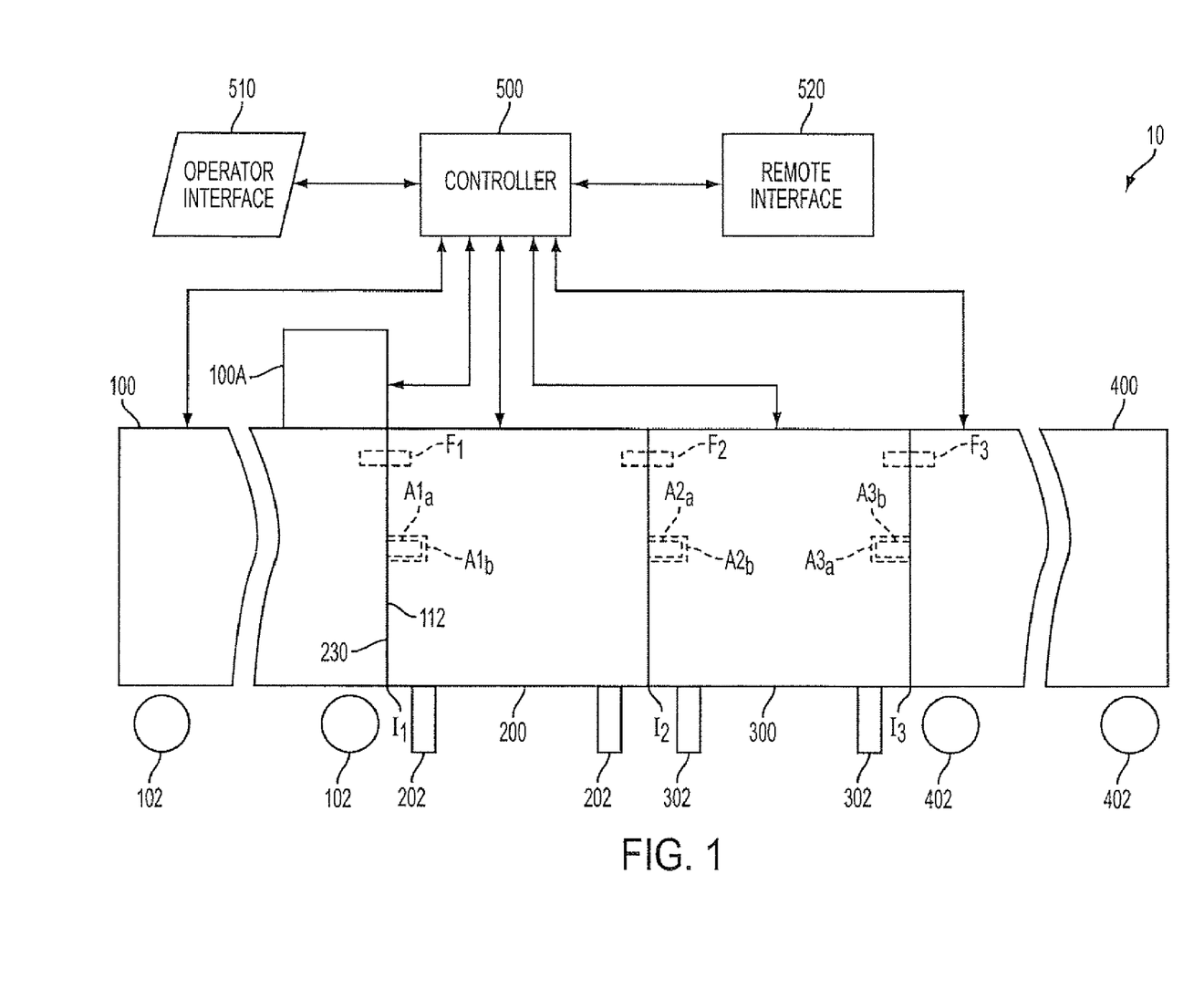
FIG. 1 is a diagrammatic front view of the modular production apparatus of the present invention showing an infeed/affixing module with attached dispensing device, a bonding module, a conditioning module and, a collection module assembled in a condition suitable for operation.

Referring now to the drawings and particularly to FIG. 1, a modular production apparatus for forming insulated rotor conductors suitable for immediate assembly into a rotor assembly for an alternating current generator in accordance with an aspect of the present invention is shown diagrammatically, referred to generally by reference numeral 10. As illustrated, the apparatus comprises a movable infeed/affixing module 100, a dispensing device 100A attached to the infeed/affixing module 100, a bonding module 200, a conditioning module 300, and a movable collection module 400. In FIG. 1, the infeed/affixing module 100, the bonding module 200, the conditioning module 300 and the collection module 400 are shown connected together in a condition suitable for forming the insulated rotor conductors defining the production apparatus 10.

The infeed/affixing module 100, bonding module 200, conditioning module 300 and collection module 400 are configured to be easily connected together to provide a continuous processing apparatus and easily disconnected from one another to enable relocation and maintenance as desired for use in a dynamic production environment. Specifically, the infeed/affixing module 100 is configured to align with and connect to the bonding module 200 at a first interface $I_1$. The conditioning module 300 is configured to align with and connect to the bonding module 200 at a second interface $I_2$. The collection module 400 is configured to align with and connect to the conditioning module 300 at a third interface $I_3$.

The infeed/affixing module 100 may be provided with wheels 102 facilitating movement of the infeed/affixing module 100 relative to the other modules of the production apparatus 10 so as to enable easy transport of a plurality of electrical conductors from a remote location to the production apparatus 10 as will be described more thoroughly herein. Additionally, the collection module 400 may also be provided with wheels 402 to enable easy transport of a plurality of finished insulated rotor conductors from the production apparatus 10 to a remote location as will be described more thoroughly herein.

Figure 1A:
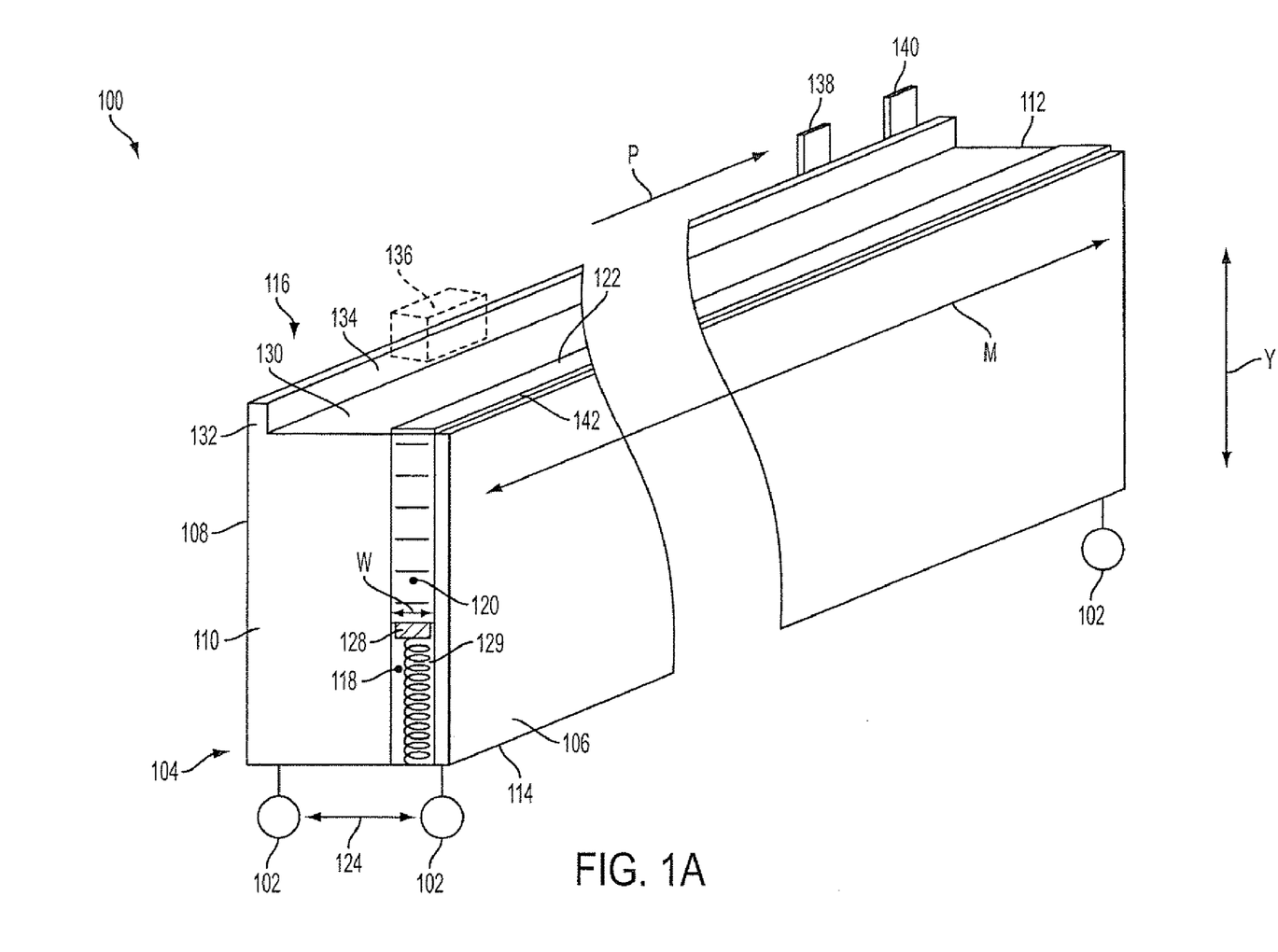
FIG. 1A is a diagrammatic perspective view of the infeed/affixing module of FIG. 1 showing a feed reservoir containing a plurality of electrical conductors therein.
Figure 2:
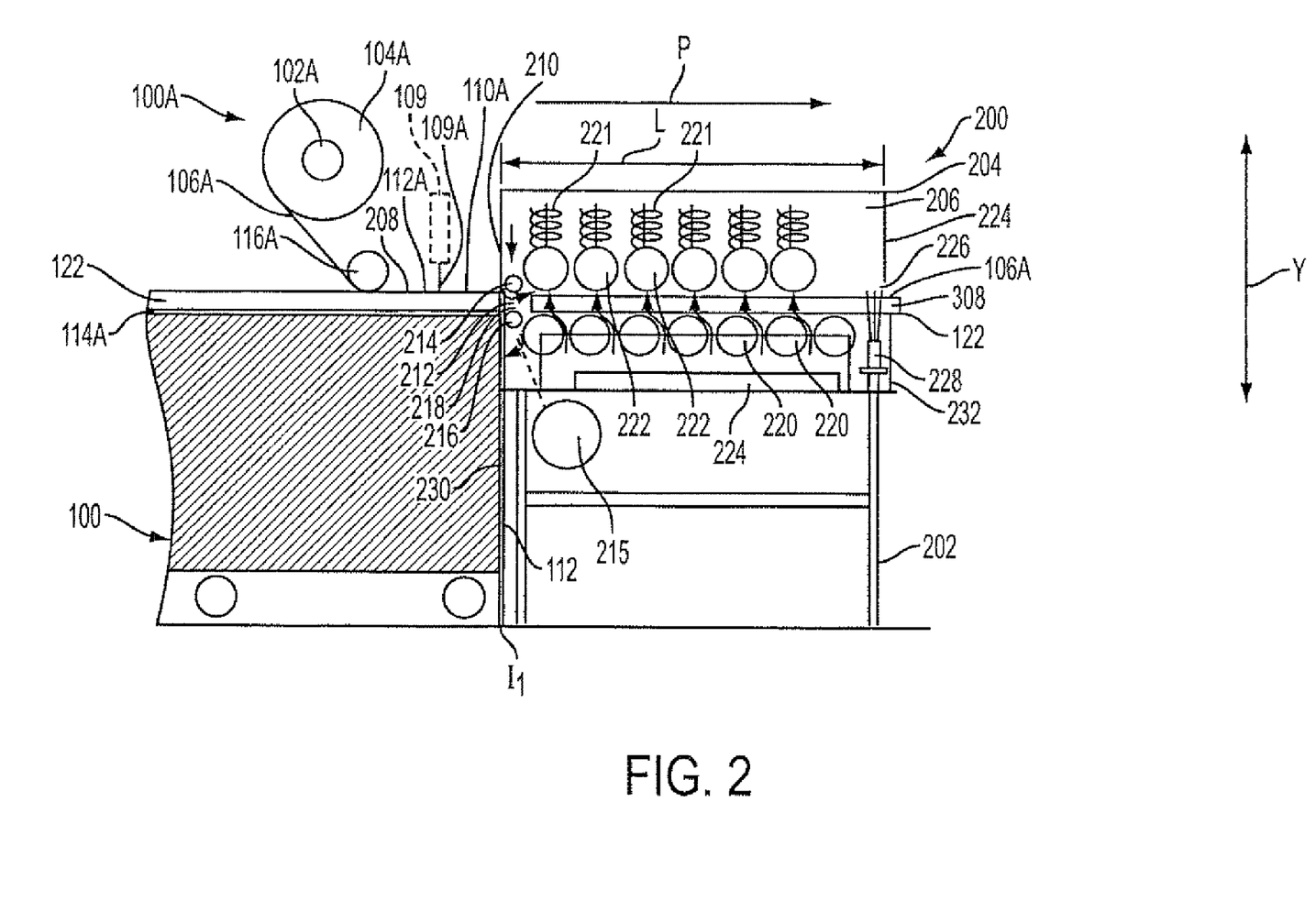
FIG. 2 is a diagrammatic side cut-away view of the bonding module shown connected to the infeed/affixing module.
Figure 3:
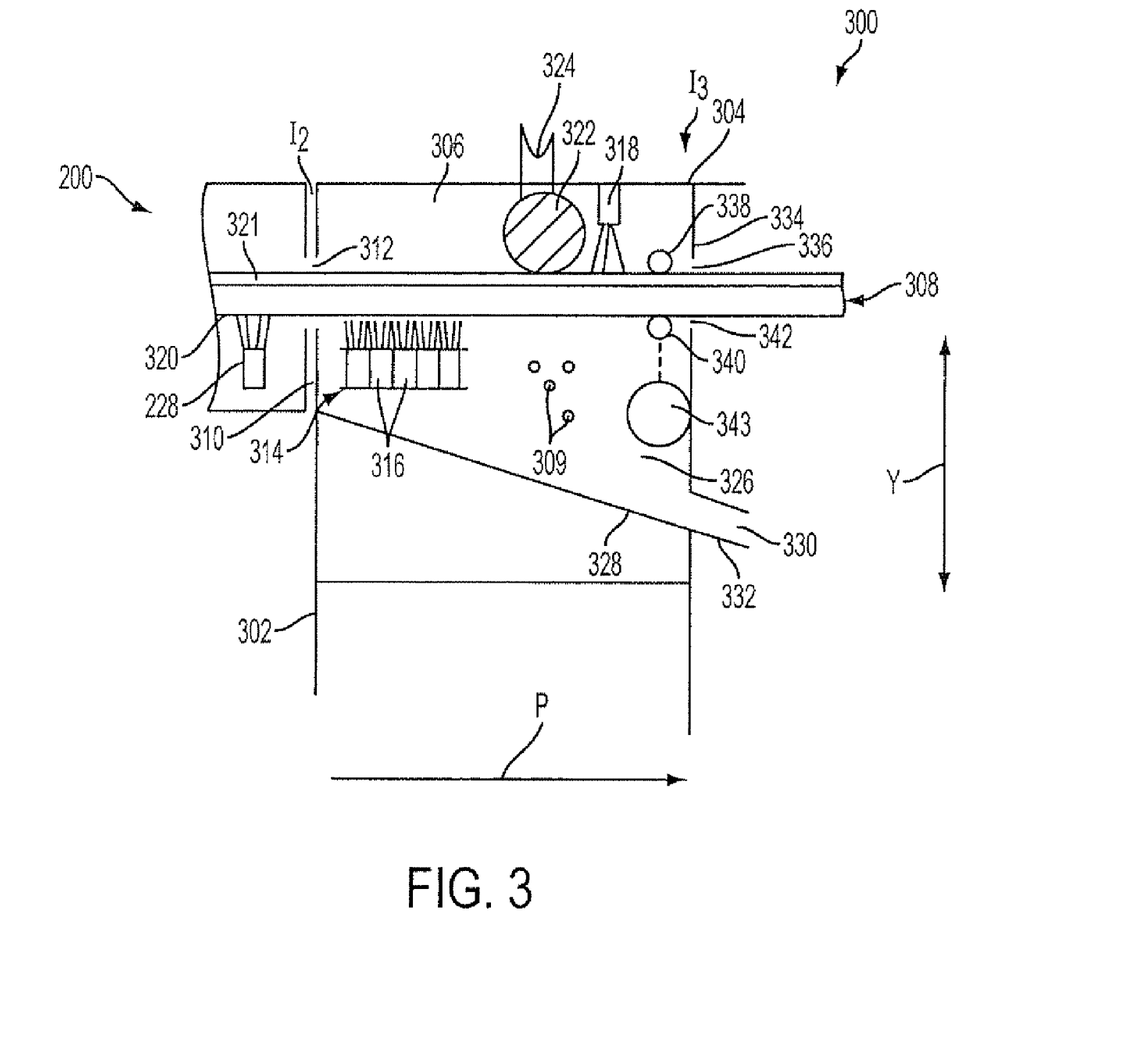
FIG. 3 is a diagrammatic side cut-away view of the conditioning module.

Although the infeed/affixing module 100 and the collection module 400 as illustrated in FIGS. 1 and 1A are provided with wheels 102 and 402, respectively, it is understood that other structure enabling easy transport of the infeed/affixing module 100 and collection module 400, e.g., provision for transport by fork lift truck or lifting by overhead means, may be utilized in other embodiments of the present invention. As illustrated in FIGS. 1, 2 and 3, the bonding module 200 and the conditioning module 300 are provided with support structures 202 and 302, respectively, rather than wheels but wheels or other supporting structure such as provision for transport by a fork lift truck may be provided in other embodiments.

The dispensing device 100A may be configured to couple with the infeed/affixing module 100 and/or the bonding module 200 and further to align with the infeed/affixing module 100 as will be described more thoroughly herein.

Referring now to FIG. 1A, the infeed/affixing module 100 is illustrated diagrammatically in partial perspective view. The infeed/affixing module 100 comprises a movable cart 104 having a front side 106, a rear side 108, a first side 110, a second side 112, a bottom side 114 and a positioning structure 116. The infeed/affixing module 100 may be provided with a plurality of wheels 102 attached to or near to the bottom side 114 to enable easy movement of the infeed/affixing module 100 along a floor surface in a manufacturing facility. As illustrated, the wheels 102 comprise caster wheels to enable steering of the infeed/affixing module 100.

A first alignment device comprising first and second portions $A1_a$, $A1_b$ is provided in which the first portion $A1_a$, illustrated as a protrusion, is located on the second side 112 of the infeed/affixing module 100 and is configured to cooperate with the second portion $A1_b$, illustrated as a recess, positioned on a first side 230 of the bonding module 200 that is proximate to the infeed/affixing module 100 such that the infeed/affixing module 100 may be aligned with the bonding module 200 at the first interface $I_1$, see FIG. 1.

A first attachment device $F_1$ is configured to cooperate with or proximate to the first side 230 of the bonding module 200 that is proximate to the second side 112 of the infeed/affixing module 200 such that the infeed/affixing module 100 may be fixedly attached to the bonding module 200 in a condition suitable for operation at the first interface $I_1$ see FIG. 1.

Referring again to FIG. 1A, positioned between the front side 106 and the rear side 108 and proximate to the front side 106 is a generally U-shaped channel 118 defining a feed reservoir 120 for receiving and storing a plurality of substantially straight electrical conductors 122 stacked vertically one atop another. The electrical conductors 122 have a predetermined length dimension and a predetermined width dimension. The feed reservoir 120 has a width dimension W in a direction 124 corresponding to the predetermined width dimension of the electrical conductors 122 stored therein, Alternatively, a structure (not shown), for example, an adjustable structure, may be provided to enable adjustment of the width dimension W such that the feed reservoir 120 may be adjusted to receive and store a plurality of electrical conductors 122 having one of a plurality of predetermined width dimensions. The width dimension W in the infeed/affixing module 100 illustrated in FIG. 1A may be configured to accept a plurality of electrical conductors 122 having a predetermined width dimension within a range of from about 0.8 inch to about 2.0 inches, The feed reservoir 120 further has a length dimension M in a process direction P corresponding to a predetermined length dimension of the plurality of electrical conductors 122 stored therein. The length dimension M in the infeed/affixing module 100 illustrated in FIG. 2 may be configured to accept a plurality of electrical conductors having a predetermined length dimension within a range of from about 10 feet to about 30 feet.

A moveable first supporting structure 128 configured to move in a vertical direction Y is positioned within the feed reservoir 120 to support the plurality of electrical conductors 122 stored therein. The first supporting structure 128 is configured to move toward the bottom side 114 in the direction Y a distance corresponding to a predetermined thickness of the electrical conductor 122 when the electrical conductor 122 is placed onto the first supporting structure 128. Conversely, the first supporting structure 128 is configured to move vertically upwardly away from the bottom side 114 a distance corresponding to the predetermined thickness of the electrical conductor 122 when the electrical conductor 122 is removed from the feed reservoir. In this fashion, a topmost electrical conductor 122 is positioned substantially parallel with and locating a bottom surface coplanar with a horizontal surface 130 of the positioning structure 116 as will be described more thoroughly herein. The first supporting structure 128 may comprise, for example, a spring biased device, a gas cylinder device, a hydraulic cylinder device, an indexing device, etc. For example, a spring structure, diagrammatically illustrated as 129, may be provided having a spring rate that causes the supporting structure 128 to move downwardly the thickness of one electrical conductor 122 each time an electrical conductor 122 is placed onto the supporting structure 128. The infeed/affixing module illustrated in FIG. 1A is configured to receive a plurality of electrical conductors having a predetermined thickness dimension within a range of from about 0.1 inch to about 0.5 inch.

The positioning structure 116 includes the horizontal surface 130 as previously mentioned, The horizontal surface 130 is positioned adjacent to the feed reservoir 120 and substantially coplanar with a bottom surface of the top-most electrical conductor 122 positioned atop the plurality of electrical conductors 122 within the feed reservoir 120.

The positioning structure 116 further comprises a guide rail 132 extending upwardly substantially at a right angle from the horizontal surface 130 in the direction Y away from the bottom side 114. The guide rail 132 includes a vertical surface 134 configured to align the electrical conductor 122 as will be described more thoroughly herein.

A positioning device 136, shown diagrammatically in FIG. 1A, coupled to the infeed affixing module 100 may be provided to move the electrical conductor 122 from the feed reservoir 120 and position it upon the horizontal surface 130 adjacent to the guide rail 132 and in contact with the vertical surface 134 such that the electrical conductor 122 is properly positioned at a first position for application of an insulating material as will be described herein. The positioning device 136 may comprise, for example, a pneumatic cylinder operated device, an electromechanical operated device or other apparatus as is well known to those skilled in the art. Alternatively, a human operator may manually move the electrical conductor 122 from the feed reservoir 120 and into position at the first position on the horizontal surface 130.

The dispensing device 100A (not shown in FIG. 1A) may be coupled to the infeed affixing module 100 proximate to the bonding module 200, see FIGS. 1 and 2. In the infeed/affixing module 100 illustrated in FIG. 1A, structures generally illustrated as 138 and 140 may be provided coupled to the guide rail 132 for aligning and coupling the dispensing device 100A to the infeed/affixing module 100. In this fashion, the dispensing device 100A may be coupled to the infeed/affixing module 100 proximate to the bonding module 200 and in alignment with the electrical conductor 122 positioned adjacent to the guide rail 132 at the first position such that the insulating material may be dispensed from the dispensing module 100A and onto the electrical conductor 122 as will be described herein.

A guiding device (not shown) may be provided for engaging a front side 142 of the electrical conductor 122 and for applying a biasing force between the electrical conductor 122 and the vertical surface 134 of the guide rail 132 such that the electrical conductor 122 remains in contact with the guide rail 132 as the electrical conductor 122 is conveyed past the dispensing device 100A and from the infeed/affixing module 100 and into the bonding module 200. In this fashion, the electrical conductor 122 remains in alignment with the dispensing device 100A as the insulating material is dispensed from the dispensing device 100A and onto the electrical conductor 122. The guiding device (not shown) in the infeed/affixing module 100 illustrated in FIG. 1A may be adjustable such that the guiding device (not shown) may be preset to accept an electrical conductor 122 having one of a plurality of predetermined width dimensions within a range of from about 0.8 inch to about 2.0 inches. Further the guiding device (not shown) may be incorporated as a guide structure on the positioning device 136.

Referring now to FIG. 2, the infeed/affixing module 100 is shown attached to the bonding module 200. Also shown is the dispensing device 100A attached to the infeed/affixing module 100 proximate to the bonding module 200. As illustrated in FIG. 2, the dispensing device 100A comprises a structure 102A for mounting a reel 104A containing a continuously wound strip of insulating material 106A. The insulating material preferably comprises a substrate formed of an epoxy glass laminate having a thickness of approximately 0.008 to 0.015 inch, and having a layer of heat activated or thermo-set adhesive having a thickness of approximately 0.0005 to 0.0020 inch.

The structure 102A may comprise a rotating spindle about which the reel 104A rotates as the insulating material 106A is dispensed onto a electrical conductor 122 moving horizontally beneath in the process direction P forming a layered conductor structure 110A having an insulating surface 112A and a conducting surface 114A. An affixing roller 116A is provided adjacent to the upper surface of the electrical conductor 122 to guide the insulating material 106A to a predetermined position onto the upper surface of the electrical conductor 122 as the layered conductor structure 110A is conveyed into the bonding module 200.

In addition, a cutting device, illustrated diagrammatically as 109, may be provided as part of or adjacent to the dispensing device 100A. The cutting device 109 may include a knife 109A actuated at predetermined times corresponding to a gap between successive ones of the electrical conductors 122 to form discrete strips of the insulating material substantially corresponding in length to the length of the electrical conductors 122.

A tensioning device (not shown) may be provided to maintain tension in the portion of the insulating material 106A that is unwound from the reel 104A before it is affixed to the electrical conductor 122 by the affixing roller 116A. The tensioning device (not shown) may comprise a friction brake or other suitable means to control rotation of the reel 104A as the strip of insulating material 106A is unwound from the reel 104A as the insulating material 106A moves into engagement with the electrical conductor 122.

Figure 1B:
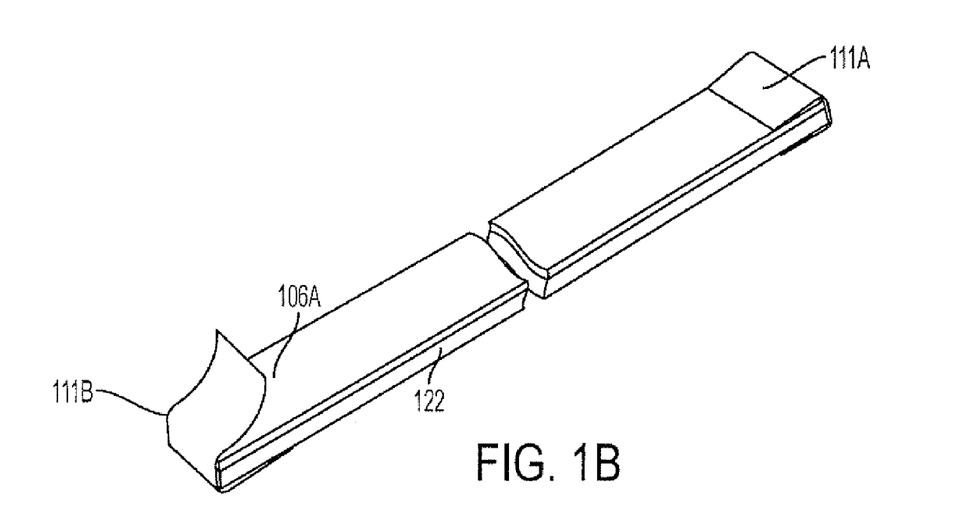
FIG. 1B is a perspective view of an electrical conductor with an insulating material applied to a top side thereof.

In an alternative embodiment, the insulating material 106A may be pre-cut into strips of a predetermined length corresponding to the length of the electrical conductors 122. In such an embodiment, the insulating material 106A is preferably held in place by means of strips of Teflon® tape 111A, 111B wrapped around the end portions of the insulating material 106A and the electrical conductor 122. This is illustrated in FIG. 1B where the Teflon® tape strip 111A is shown in position wrapped around one end of the insulating material 106A and the electrical conductor 122, and the Teflon® tape strip 111B is shown partially wrapped around the opposite end, i.e., in the process of being wrapped around the end. An operation performed in this embodiment may involve an operator manually placing a pre-cut strip of insulating material 106A on an electrical conductor 122, and applying the strips of Teflon® tape 111A and 111B to the ends thereof at the infeed/affixing module 100 prior to transfer of the assembled insulating material 106A and electrical conductor 122 into the bonding module 200.

Further, it should be understood that the step of moving individual ones of the electrical conductors 122 from the feed reservoir 120 to the aligned position adjacent the guide rail 132 may be performed manually. In such an arrangement, the support structure 128 moves each successive electrical conductor 122 to a vertical position that is convenient for an operator to slide it across the horizontal surface 130 to the guide rail 132.

When the last electrical conductor 122 has been removed from the feed reservoir 120, the first attachment device $F_1$ may be detached from the infeed/affixing module 100 and the bonding module 200 to permit detachment of the infeed/affixing module 100 from the production apparatus 10. For example, a plurality of infeed/affixing modules 100 may be provided such that another infeed/affixing module 100 containing another plurality of electrical connectors 122 may be positioned in alignment with the bonding module 200 and attached thereto in order to continue manufacturing insulated rotor conductors with only a brief interruption of the process.

As may further be seen in FIG. 2, a bonding module 200 in accordance with an aspect of the present invention is illustrated in diagrammatic side cut-away view attached to the infeed/affixing module 100 with the dispensing device 100A attached thereto. As illustrated, the bonding module 200 comprises a supporting structure 202 upon which an enclosure 204 is mounted. The enclosure 204 defines a box-shaped chamber 206 within which a layered conductor structure 208 being conveyed therethrough in the process direction P is heated to a predetermined bonding temperature, i.e., a predetermined minimum temperature, and a predetermined compressive pressure is applied to the opposite sides of the layered conductor structure 208 forming an insulated rotor conductor as will be described more thoroughly herein.

The enclosure 204 comprises an entry side 210 having a first aperture 212 therein defining an entry slot through which layered conductor structures 208 are conveyed from the infeed/affixing module 100 and into the bonding module 200. Positioned within the chamber 206 and adjacent to the first aperture 212, a cylindrically-shaped first entry roller 214 and a cylindrically-shaped second entry roller 216 are positioned adjacent to one another and define an entry nip 218 therebetween for grasping a layered conductor structure 208 entering the aperture 212 from the infeed/affixing module 100. The first entry roller 214 and the second entry roller 216 preferably comprise rubber coated rollers having axes (not shown) extending in a direction substantially perpendicular to the process direction P.

The space between the first entry roller 214 and the second entry roller 216 in the direction Y may be adjustable so that the entry nip 218 may be configured to accept a layered conductor structure 208 having a predetermined thickness in the direction Y.

One or both of the first entry roller 214 and the second entry roller 216 is driven to rotate in a direction such that the layered conductor structure 208 grasped within the entry nip 218 is caused to move in the process direction P. A rotational driver, for example, a first electric motor 215, may be coupled to one or both of the first entry roller 214 and the second entry roller 216 such that layered conductor structure 208 may be conveyed through the entry nip 218 and into the bonding module 200 at a predetermined conveying velocity.

A plurality of cylindrically-shaped transport rollers 220 are arranged within the enclosure 204 adjacent to and parallel with one another and defining a planar conveying structure upon which the layered conductor structure 208 is supported as it is conveyed through the bonding module 200. The transport rollers 220 have axes (not shown) extending in a direction substantially perpendicular to the process direction P. The transport rollers 220 have bearings (not shown) therein and are mounted on shafts (not shown) such that the transport rollers 220 may rotate freely about the shafts (not shown). In this fashion, the plurality of transport rollers 220 and the entry nip 218 defined by the first entry roller 214 and the second entry roller 216 comprise a conveying device for conveying the layered conductor structure 208 into and through the bonding module 200. The transport rollers 220 may be made from a material such as, for example, stainless steel, and the bearings (not shown) used in the transport rollers 220 may be high temperature bearings.

A plurality of cylindrically-shaped pressure rollers 222 are arranged adjacent to and parallel with one another and on an opposite side of the layered conductor structure 208 from the transport rollers 220 such that the layered conductor structure 208 moving through the bonding module 200 is contacted on opposite sides by the transport rollers 220 and the pressure rollers 222. The pressure rollers 222 include bearings (not shown) mounted on shafts having axes extending in a direction substantially perpendicular to the process direction P. The pressure rollers 222 in the bonding module 200 illustrated in FIG. 2 may be made from a material such as, for example, steel or aluminum, and may have a rubber coating applied to an exterior circumferential surface.

The pressure rollers 222 may include an adjustment mechanism 221 for adjusting the pressure rollers in the vertical direction Y relative to the transport rollers 220, see FIG. 2. The pressure rollers 222 may be adjusted so as to accept layered conductor structures having a predetermined thickness dimension comprising the combined thickness of the electrical conductor 122 and the insulating material 106A.

The adjustment mechanism 221 for the pressure rollers 222 may comprise, for example, a spring biased device, a hydraulic cylinder biased device, an air cylinder biased device, etc., such that the pressure rollers 222 in cooperation with the transport rollers 220 may apply a predetermined compressive pressure between the opposite sides of an insulated conductor structure 208 moving between the plurality of transport rollers 220 and the plurality of pressure rollers 222. In the bonding module illustrated in FIG. 2, the predetermined compressive pressure may be within a range of from about 40 psi to about 400 psi and the compressive pressure is preferably set at or close to the lowest value necessary to enable bonding between the insulating material 106A and the electrical conductor 122, as is described further below.

A heating device 224 is provided within the enclosure 204 for heating the insulated conductor structure 208 moving therethrough to a predetermined minimum temperature such that the insulating material 106A affixed to the electrical conductor 122, see FIG. 2, is bonded to the electrical conductor 122. The heating device 224 is configured to heat the portion of the insulated conductor structure 208 that is within the confines of the enclosure 204 to the predetermined minimum temperature while the predetermined compressive pressure is being applied to the opposite sides of the insulated conductor structure 208 as previously described.

Figure 2A:
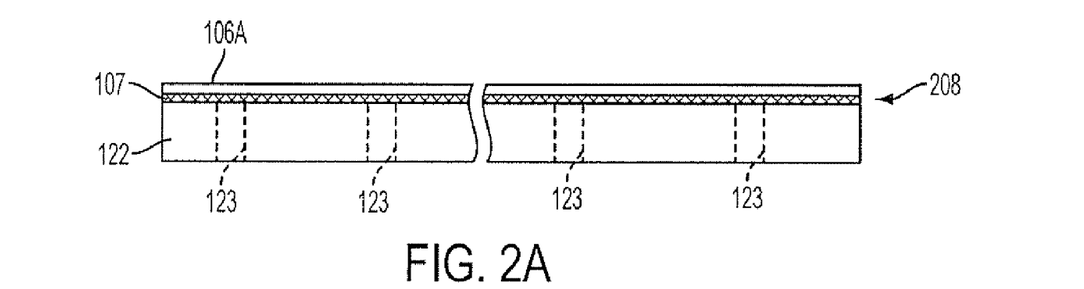
FIG. 2A is a side view of the electrical conductor with a layer of insulating material bonded thereto.

The insulating material 106A is preferably provided with a layer of heat activated adhesive 107 on a lower surface thereof for engagement with the electrical conductor 122, see FIG. 2A. For example, in a preferred embodiment, the heat activated adhesive may comprise a B-staged adhesive. Specifically, the lower surface of the insulating material 106A may be coated, either continuously or discontinuously at discrete locations, with an adhesive which generally may comprise an epoxy, phenolic, epoxy-phenolic, or other suitable resin, which is in the "B" stage thermoset adhesive category. Preferably the adhesive comprises either an epoxy or nitrile-phenolic rubber resin. The B-staged adhesive is tack-free at ambient temperature and becomes soft and thus flows at elevated temperatures and then permanently sets to adhesively bond the adjacent layers of the insulated conductor 208 into a solid unit.

The predetermined compressive pressure maintains the insulating material 106A in contact with the electrical conductor 122 while the insulated conductor structure 208 is heated to the predetermined minimum temperature to cause the B-staged adhesive to bond the insulating material 106A to the electrical conductor 122 forming an insulated rotor conductor 308, see FIGS. 2 and 2A. It should be understood that the insulated rotor conductor 308 generally comprises a section of the adhesively bonded insulating material 106A and electrical conductor 122, i.e., a bonded leading end section of the insulated conductor structure 208, or comprises the entire insulated conductor structure 208 that has passed through the bonding module 200 and that has been converted into a solid unit by adhesive bonding of the insulating material 106A to the electrical conductor 122.

The heating device 224 may comprise at least one of a convection heating device, a radiant heating device and an induction heating device. The predetermined minimum temperature used in the bonding module 200 illustrated in FIG. 2 may be within a range of from about 400 degrees F. to about 600 degrees F.

The bonding module 200 has a length selected to provide a sufficient dwell time for the adhesive to be activated for bonding the insulating material 106A to the electrical conductor 122. In the preferred embodiment, the length L of the bonding module 200 is less than 6 feet in the process direction P, and most preferably, the length L is approximately 3-5 feet to minimize the use of manufacturing facility space.

Referring now to FIG. 2, the enclosure 204 also comprises an exit side 224 having a second aperture 226 therein defining a slot through which the insulated rotor conductor 308 is conveyed in the process direction P from the bonding module 200 and into the conditioning module 300, see also FIG. 1. A first cooling device 228 may be positioned within the enclosure 204 adjacent to the second aperture 226 to cool the insulated rotor conductor 308 moving through the second aperture 226. The first cooling device 228 may comprise one or more nozzles for directing a flow of cooling fluid, for example, compressed air, onto one or more surfaces of the insulated rotor conductor 308 moving through the second aperture 226. In this fashion, the insulated rotor conductor 308 may be cooled a first amount before entering the conditioning module 300, see FIGS. 1 and 2.

Referring now to FIGS. 1, 2 and 3, the bonding module 200 has a second side 232 positioned proximate to the conditioning module 300. A second alignment device may be optionally positioned on the second side 232 of the bonding module 200. The second alignment device may comprise first and second portions $A2_a$ and $A2_b$, in which the first portion $A2_a$, illustrated as a protrusion, is located on the second side 232 of the bonding module 200 and is configured to cooperate with the second portion $A2_b$, illustrated as a recess, positioned on a first side 310 of the conditioning module 300 proximate to the bonding module 200 such that the conditioning module 300 may be aligned with the bonding module 200 at the second interface $I_2$, see FIGS. 1 and 3.

A second attachment device $F_2$ is provided to cooperate between the second side 232 of the bonding module 200 and the first side 310 of the conditioning module 300. Hence, the bonding module 200 may be fixedly attached to the conditioning module 300 at the second interface $I_2$ in a condition suitable for operation, see FIGS. 1 and 3.

Referring now to FIG. 3, the conditioning module 300 in accordance with an aspect of the present invention is illustrated in diagrammatic cut-away side view connected to the bonding module 200 at the second interface $I_2$. As illustrated, the conditioning module 300 comprises a support structure 302 upon which an enclosure 304 is mounted. The enclosure 304 defines a chamber 306 within which an insulated rotor conductor 308 being conveyed therethrough in the process direction P is preferably cooled to a predetermined maximum temperature as will be described more thoroughly herein.

The enclosure 304 comprises a first aperture 312 located at the first side 310 and defines a slot through which the insulated rotor conductor 308 is conveyed from the bonding module 200 and into the chamber 306. Positioned within the chamber 306 is a second cooling device 314 configured to cool the insulated rotor conductor 308 a second amount to a predetermined maximum temperature while the insulated rotor conductor 308 remains within the chamber 306. The second cooling device 314 in the illustrated conditioning module 300 comprises a plurality of nozzles 316 configured to direct a flow of cooling fluid, for example, compressed air onto one or more surfaces of the insulated rotor conductor 308 being conveyed through the conditioning module 300.

The electrical conductors 122 may be formed with a plurality of apertures 123, such as oval apertures extending through the electrical conductor 122, see FIG. 2A. It should be noted the insulating material 106A that is affixed to the electrical conductor 122 at the infeed/affixing module 100 may or may not have corresponding apertures pre-cut into the insulating material 106A. Thus, in the case where the insulating material 106A does not have pre-cut apertures, the apertures 123 in the electrical conductor 122 may be covered by the insulating material 106A.

Referring again to FIG. 3, a cylindrically-shaped pressure roller 322 is positioned adjacent the upper surface of the insulated rotor conductor 308 within the chamber 306, downstream from the second cooling device 314. The pressure roller 322 is supported on bearings and on a shaft (not shown) that has an axis oriented substantially perpendicular to the process direction P. The pressure roller 322 is coupled to a second pressure application device 324, for example, a spring biased device or, preferably, a hydraulic cylinder biased device that is configured to apply a second compressive pressure to the pressure roller 322 toward the insulated rotor conductor 308 in the direction Y. The pressure roller 322 preferably comprises a rubber roller and the second pressure application device 324 causes the pressure roller 322 to apply a second compressive pressure between an exterior circumferential surface of the pressure roller 322 and the insulated rotor conductor 308 to cause the insulating material 106A to be punched downwardly through the apertures 123 in the electrical conductor 122, thereby forming loose, released portions of the insulating material 106A.

A debris removing device 318 is positioned adjacent to and downstream from the pressure roller 322, in the process direction P, see FIG. 3. The debris removing device 318 is configured to provide a high pressure stream of air, such as a stream of air at approximately 90 psi, to blow debris 309 comprising the loose, released portions of insulating material 106A from the location of the apertures 123 downwardly away from the insulated rotor conductor 308.

The chamber 306 further comprises a cavity 326 into which the insulating material debris 309 falls and is collected. A lower side 328 of the enclosure 304 defines a floor of the cavity 326. A discharge aperture 330 is positioned on or near the lower side 328 of the enclosure 304. The discharge aperture 330 defines a coupling 332 to which a vacuum source (not shown) may be coupled such that the insulating material debris 309 may be removed from the cavity 326 where it has collected.

The enclosure 304 further comprises a second or exit side 334 having a second aperture 336, defining an exit slot through which the insulated rotor conductor 308 is conveyed in the process direction P from the conditioning module 300 and into the collection module 400, see FIGS. 1 and 3. First and second cylindrically-shaped exit rollers 338, 340 are positioned within the enclosure 304 proximate to the second aperture 336. The first and second exit rollers 338, 340 are supported for rotation about axes (not shown) extending in a direction substantially perpendicular to the process direction P. The first exit roller 338 is configured to engage with the insulating side 321 of the insulated rotor conductor 308, and the second exit roller 340 is configured to engage with the conducting side 320 of the insulated rotor conductor 308.

The first exit roller 338 and the second exit roller 340 are positioned relative to one another in the vertical direction Y so as to define an exit nip 342 therebetween for grasping the insulated rotor conductor 308 between the first and second exit rollers 338 and 340. The spacing between the first exit roller 338 and the second exit roller 340 in the direction Y may be adjustable so that the exit nip 342 may accept a layered conductor structure 308 having a predetermined thickness.

One or both of the first exit roller 338 and the second entry roller 340 is caused to rotate in a direction such that the insulated rotor conductor 308 grasped within the exit nip 342 is caused to move toward the exit side 334 in the process direction P. A rotational driver, for example, a second electric motor 343, may be coupled to one or both of the first exit roller 338 and the second exit roller 340 such that the insulated rotor conductor 308 may be conveyed through the exit nip 342 and further through the third aperture 336 and into the collection module 400, see FIGS. 1 and 3.

The first exit roller 338 and the second exit roller 340, see FIG. 3, are synchronized with the first entry roller 214 and the second entry roller 216 within the bonding module 200, see FIG. 2, such that the insulated rotor conductor 308 is conveyed through the exit nip 342, see FIG. 3, at substantially the same predetermined conveying velocity as the layered conductor structure 208 is conveyed through the entry nip 218, see FIG. 2. In this fashion, the first and second entry rollers 214, 216 operate in cooperation with the first and second exit rollers 338, 340, and in combination with the plurality of transport rollers 220, and the first and second electric motors 215, 343 comprise a conveying device for conveying the layered conductor structure 208 into and through the bonding module 200 and the insulated rotor conductor 308 into and through the conditioning module 300 and further into the collection module 400 at the predetermined conveying velocity, see FIGS. 1, 2 and 3. In the modular apparatus shown in FIGS. 1, 2 and 3, the predetermined conveying velocity may be within a range of from about 1 foot per minute to about 20 feet per minute.

It should be noted that the distance between the first and second entry rollers 214, 216 and the first and second exit rollers 338, 340 is less than the length of an electrical conductor 122 to be conveyed from the infeed/affixing module 100 and through the apparatus 10. Hence, at least one of the pairs of entry rollers 214, 216 or exit rollers 338, 340 will be engaged with the layered conductor structure 208/insultated rotor conductor 308 at all times as it passes through the apparatus 10.

A third alignment device is positioned on the second side 334 of the conditioning module 300. The third alignment device may comprise first and second portions $A3_a$, $A3_b$, in which the first portion $A3_a$, illustrated as a recess, is located on the second side 334 of the conditioning module 300 and is configured to cooperate with the second portion $A3_b$, illustrated as a protrusion, positioned on a first side 410 of the collection module 400 proximate to the conditioning module 300 such that the collection module 400 may be aligned with the conditioning module 300 at the third interface $I_3$, see FIGS. 1 and 4.

A third attachment device $F_3$ is provided to cooperate between the second side 334 of the conditioning module 300 and the first side 410 of the collection module 400. Hence, the conditioning module 300 may be fixedly attached to the collection module 400 at the third interface $I_3$ in a condition suitable for operation, see FIGS. 1 and 4.

Figure 4:
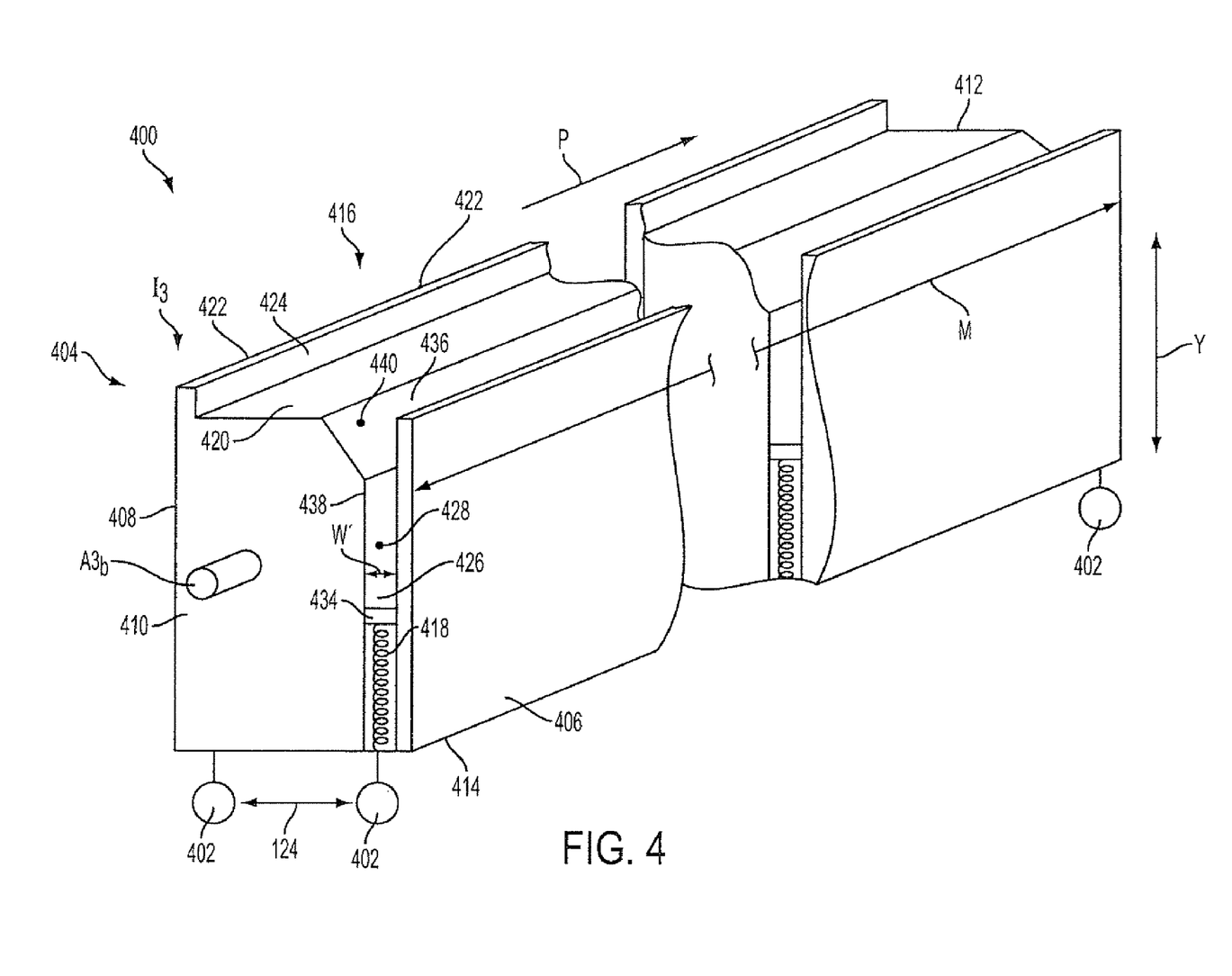
FIG. 4 is a partial diagrammatic perspective view of the collection module showing a collection reservoir for collection of a plurality of finished insulated rotor conductors.

Referring now to FIG. 4, a collection module 400 in accordance with an aspect of the present invention is illustrated diagrammatically in partial perspective view. The collection module 400 is configured to collect a plurality of insulated rotor conductors 308 conveyed from the conditioning module 300 and to transport the plurality of insulated rotor conductors 308 to a remote location.

The illustrated collection module 400 comprises a movable cart 404 having a front side 406, a rear side 408, a first side 410, a second side 412, a bottom side 414 and a collection structure 416. The collection module 400 may be provided with a plurality of wheels 402 attached to or near to a surface of the bottom side 414 to enable easy movement of the collection module along a floor surface in a manufacturing facility. As illustrated, the wheels 402 may comprise caster wheels to enable steering of the collection module 400.

The collection structure 416 includes a horizontal surface 420 configured to receive an insulated rotor conductor 308 as it is conveyed from the conditioning module 300. The horizontal surface 420 is positioned a small spaced distance toward the bottom side 414 in the vertical direction Y from the conducting surface 320 of the insulated rotor conductor 308 as it is conveyed from the conditioning module 300. In this fashion, the insulated rotor conductor 308 is supported upon and moves along the horizontal surface 420 in the process direction P as the insulated rotor conductor 308 is conveyed from the conditioning module 300. Further, the insulated rotor conductor 308 comes to rest upon the horizontal surface 420 after it is fully conveyed from the conditioning module 300.

The collection structure 416 further comprises a guide rail 422 extending perpendicularly upwardly substantially at a right angle from the horizontal surface 420. The guide rail 422 has a vertical surface 424 configured to guide the insulated rotor conductor 308 substantially in the process direction P as it is conveyed from the conditioning module 300 and onto the horizontal surface 420 and to prevent movement of the insulated rotor conductor 308 away from the front side 406 in the direction 124 beyond the vertical surface 424.

A generally U-shaped channel 426 defining a collection reservoir 428 for collection of a plurality of insulated rotor conductors 308, see FIG. 3, is positioned proximate to the front side 406 and between the front side 406 and the rear side 408 and extends in the process direction P a distance M' from the first side 410 to the second side 412. The distance M' substantially corresponds to the length of the insulated rotor conductors 308 to be collected within the collection reservoir 428. The collection module 400 may have a length dimension M' configured to receive insulated rotor conductors 308 having a predetermined length dimension within a range of from about 10 feet to about 30 feet.

The collection reservoir 428 has a width dimension W' extending in the direction 124 that is configured to accommodate insulated rotor conductors 308 having a predetermined width dimension. In the illustrated collection module 400, the width dimension W' may be sized to accommodate insulated rotor conductors 308 having one of a plurality of predetermined width dimensions within a range of from about 0.8 inch to about 2.0 inches. Alternatively, an adjustable structure (not shown) may be provided configured to enable adjustment of the width dimension W' such that the collection reservoir 428 may be pre-adjusted to accept a plurality of insulated rotor conductors 308 having one of a plurality of predetermined width dimensions.

A moveable second supporting structure 434 configured to move in the vertical direction Y is positioned within the collection reservoir 428 to support the insulated rotor conductors 308 collected therein. The second supporting structure 434 is configured to move toward the bottom side 414 a distance corresponding to the thickness of the insulated rotor conductor 308 when an insulated rotor conductor 308 is placed into the collection reservoir 428. That is, the weight of each insulated rotor conductor 308 will cause the supporting structure to move vertically downwardly a distance equal to the thickness of one insulated rotor conductor 308. Conversely, the second supporting structure 434 is further configured to move away from the bottom side 414 a distance corresponding to the thickness of the insulated rotor conductor 308 when the insulated rotor conductor 308 is removed from the collection reservoir 428. In this fashion, a plurality of insulated rotor conductors 308 may be collected and stored one atop the previous one in the collection reservoir 428. The second supporting structure 434 may comprise, for example, a spring biased device, a gas cylinder device, a hydraulic cylinder device, an indexing device, etc. For example, a spring structure, diagrammatically illustrated as 418, may be provided having a spring rate that causes the supporting structure to move downwardly the thickness of one insulated rotor conductor 308 each time an insulated rotor conductor 308 is placed into the supporting structure 434.

The collection structure 416 further comprises a surface 436 extending at an angle from the horizontal surface 420 to a first wall 438 of the collection reservoir 428 thereby defining a ramp 440 upon which the insulated rotor conductor 308 may be moved from the horizontal surface 420 into the collection reservoir 428. In this fashion, an operator may easily move an insulated rotor conductor 308 that has been conveyed from the conditioning module 300 and onto the horizontal surface 420 into the collection reservoir 428 by sliding the insulated rotor conductor 308 across the surface 436 of the ramp 440.

It should be noted that the conditioning module 300 cools the insulated rotor conductors 308 sufficiently that they may be safely handled by an operator. For example, the temperature of the insulated rotor conductor 308 may be decreased to approximately 100 degrees F. as they exit the conditioning module 300.

A plurality of insulated rotor conductors 308 may be placed into the collection reservoir 428 one atop the previous one until the collection reservoir 428 is filled substantially to capacity. Subsequently, the collection module 400 may be disconnected from the conditioning module 300 by releasing the third attachment device $F_3$, see FIG. 1. The collection module 400 may now be moved to a remote location such that the plurality of insulated rotor conductors 308 contained therein may be further processed or stored.

A plurality of collection modules 400 may be provided such that another collection module 400 may now be positioned in alignment with the conditioning module 300 and attached thereto as previously described in order to continue manufacturing insulated rotor conductors with only a minimal interruption of the process.

Referring now to FIG. 1, the modular apparatus further comprises a controller 500 coupled to the infeed/affixing module 100, the dispensing device 100A, the bonding module 200, the conditioning module 300 and the collection module 400. The controller 500 may comprise, for example, a programmable logic controller, a microcomputer, a personal computer, etc. or other processing device as is well known those skilled in the art.

The controller 500 may be configured to control functions of the modular production apparatus 10 including, for example, the positioning device 136, see FIG. 1A, the dispensing device 100A, see FIG. 2, the tensioning device (not shown), the heating device 224, see FIG. 2, the first pressure application device 221, the first cooling device 228, the second cooling device 316, see FIG. 3, the debris removing device 318, the second pressure application device 324, and the conveying device.

An operator interface 510 may be coupled to the controller 500 to enable a human operator to enter values corresponding to at least one of a predetermined operating temperature for the bonding module 200, predetermined compressive pressures within the bonding module 200 and conditioning module 300, and a predetermined conveying velocity for the entry and exit roller pairs 214, 216 and 338, 340. Additionally, a remote interface 520 may be connected to the controller 500 to enable connection to a remote processing device (not shown) such that the controller 500 may be controlled by the remote processing device (not shown) from a remote location.

Figure 5:
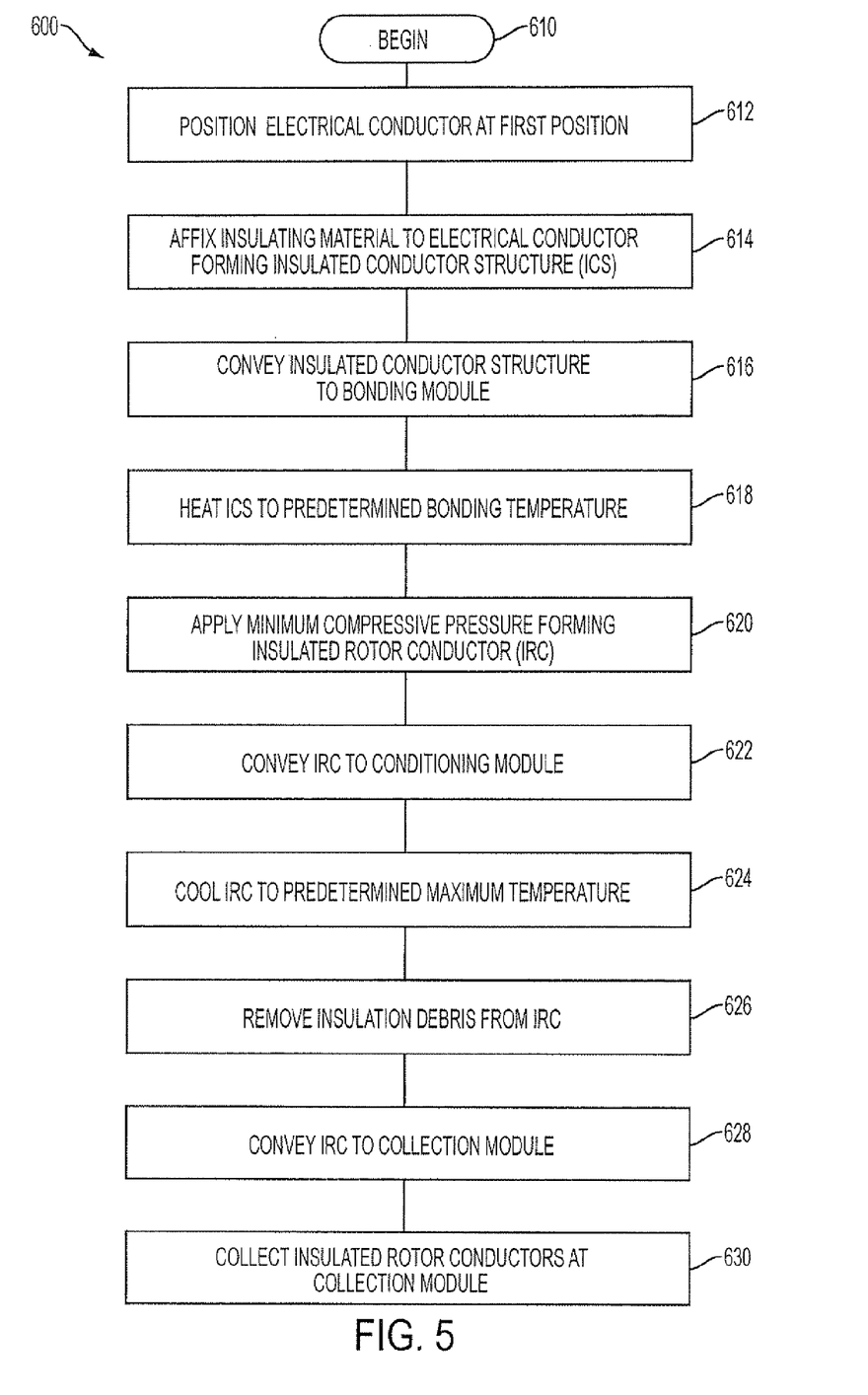
FIG. 5 is a flow diagram illustrating the steps of the present invention.

Referring now to FIG. 5, a flow diagram 600 of the steps comprising an aspect of the present invention is illustrated. The process illustrated in FIG. 5 may be a continuous iterative process beginning at step 610. In step 612, an electrical conductor 122 is removed from the feed reservoir 120 and positioned at the first position in preparation for application of the insulating material 106A thereto.

In step 614, the insulating material 106A is affixed at one side of the electrical conductor 122 at the infeed/affixing module 100 forming an insulated conductor structure (ICS) 208.

In step 616, the insulated conductor structure (ICS) 208 is conveyed from the infeed/affixing module 100 to the bonding module 200.

In step 618, the insulated conductor structure (ICS) 208 is heated to a predetermined bonding temperature within the bonding module 200.

In step 620, a predetermined compressive pressure is applied between the opposite sides of the insulated conductor structure (ICS) 208 ensuring contact between the insulating material 106A and the electrical conductor 122 via the heated layer of adhesive 107 within the bonding module 200 forming an insulated rotor conductor (IRC) 308.

In step 622, the insulated rotor conductor (IRC) 308 is conveyed to the conditioning module 300.

In step 624, the insulated rotor conductor (IRC) 308 is cooled to a predetermined maximum temperature by the second cooling device 316 within the conditioning module 300.

In step 626, insulating material debris 309 is removed from the insulated rotor conductor (IRC) 308 by the debris removing device 318 within the conditioning module 300.

In step 628, the insulated rotor conductor (IRC) 308 is conveyed from the conditioning module 300 to the collection module 400.

In step 630, the insulated rotor conductor (IRC) 308 is collected and stored within the collection reservoir 428 in the collection module 400.

The process may be performed successively until a desired number of insulated rotor conductors have been manufactured.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for forming insulated rotor conductors comprising a flat electrical conductor having a layer of insulating material bonded thereto, said apparatus comprising a plurality of modules detachably attached to each other for conveying said layer of insulating material and individual ones of said electrical conductors in a process direction through said modules, said modules comprising:

an infeed module for supplying individual ones of said electrical conductors from a stack of electrical conductors to a predetermined first position in said infeed module;

a bonding module adjacent to said infeed module for bonding a layer of said insulating material to said electrical conductors to form a solid unitary structure defining said insulated rotor conductors, said bonding module comprising:

a heating chamber enclosing a heating device for heating said electrical conductors and said layer of insulating material to a predetermined temperature to thereby bond said layer of insulating material to said individual electrical conductors;

an infeed opening formed in a side of said heating chamber and aligned with said first position for receiving said electrical conductors and said layer of said insulating material in said process direction;

an exit opening formed in a side of said heating chamber opposite and aligned with said infeed opening for discharging said insulated rotor conductors from said bonding module; and a pair of entry rollers located adjacent said infeed opening and opposite said exit opening, and a drive motor for driving said entry rollers in a forward direction to convey said layer of insulating material and individual electrical conductors from said infeed module, through said heating chamber;

a conditioning module located downstream from said bonding module, said conditioning module comprising:

a conditioning chamber enclosing a cooling device for cooling said insulated rotor conductors to a predetermined maximum temperature;

an infeed opening formed in a side of said conditioning chamber and aligned with said exit opening of said heating chamber;

an exit opening formed in a side of said conditioning chamber opposite and aligned with said infeed opening of said conditioning chamber; and a pair of exit rollers located adjacent said exit opening and opposite said infeed opening of said conditioning chamber, and a drive motor for driving said exit rollers in a forward direction to convey said insulated rotor conductors from said bonding module, through said conditioning chamber; and a collection module located downstream from said conditioning module in said process direction for receiving said insulated rotor conductors from said exit rollers, said collection module including a collection reservoir for receiving a plurality of said insulated rotor conductors in vertically stacked relation;

wherein a feed reservoir has a predetermined length between opposing sides of said infeed module in said process direction for receiving electrical conductors of a maximum length, and a distance between said entry rollers and said exit rollers is less than said predetermined length for said entry and exit rollers to simultaneously engage one of said electrical conductors extending across plural modules.

2. The apparatus of claim 1, wherein said infeed module and said collection module comprise movable carts supported on rollers such that said infeed module is movable in a direction toward and away from said infeed opening side of said bonding module, and said collection module is movable in a direction toward and away from said exit opening side of said bonding module.

3. The apparatus of claim 2, wherein said infeed module and said collection module each include alignment devices for engaging an adjacent module to align said infeed module and said collection module in said process direction as said infeed module and said collection module are moved on said rollers in said direction toward said bonding module.

4. The apparatus of claim 1, wherein said bonding module has a length that is less than said predetermined length of said feed reservoir.

5. The apparatus of claim 1, wherein said cooling device comprises a forced air cooling device for blowing cooling air over said insulated rotor conductor within said conditioning chamber.

6. The apparatus of claim 1, wherein said electrical conductor comprises a plurality of holes, and said conditioning module further includes a pressure roller engaging said insulated rotor conductor to press said insulating material into said holes, forming a loose, released portion of said insulating material.

7. The apparatus of claim 6, wherein said conditioning module further includes a debris removing device comprising a forced air stream directed at said insulated rotor conductor to blow said loose, released portion of said insulating material away from said insulated rotor conductor and into a cavity formed in a lower portion of said conditioning module.

8. The apparatus of claim 1, wherein said infeed module further comprises a feed reservoir for storing a plurality of said electrical conductors in vertically stacked relation, and a positioning structure for aligning individual ones of said electrical conductors from said feed reservoir in said predetermined first position.

9. The apparatus of claim 8, wherein said infeed module comprises a vertically movable support located within said feed reservoir, said vertically movable support being supported to move upwardly a distance substantially equal to at least a vertical thickness of one said electrical conductors when an uppermost electrical conductor is removed from said plurality of electrical conductors in vertically stacked relation.

10. The apparatus of claim 1, wherein said collection module comprises a vertically movable support located within said collection reservoir, said vertically movable support being supported to move downwardly a distance substantially equal to at least a vertical thickness of one said insulated rotor conductors when an uppermost insulated rotor conductor is added to said plurality of insulated rotor conductors in vertically stacked relation.

11. The apparatus of claim 1, wherein said cooling device comprises a second cooling device, and said bonding module further comprises a first cooling device located adjacent to said exit opening of said heating chamber to cool said insulated rotor conductors.

12. An apparatus for forming insulated rotor conductors comprising a flat electrical conductor having a layer of insulating material bonded thereto, said apparatus comprising a plurality of modules detachably attached to each other for conveying said layer of insulating material and individual ones of said electrical conductors in a process direction through said modules, said modules comprising:
 an infeed module for supplying individual ones of said electrical conductors to a predetermined first position in said infeed module;
 a bonding module adjacent to said infeed module for bonding a layer of said insulating material to said electrical conductors to form a solid unitary structure defining said insulated rotor conductors, said bonding module comprising:
  a heating chamber enclosing a heating device for heating said electrical conductors and said layer of insulating material to a predetermined temperature to thereby bond said layer of insulating material to said individual electrical conductors;
  an infeed opening formed in a side of said heating chamber and aligned with said first position for receiving said electrical conductors and said layer of said insulating material in said process direction;
  an exit opening formed in a side of said heating chamber opposite and aligned with said infeed opening for discharging said insulated rotor conductors from said bonding module; and
  a first cooling device located adjacent to said exit opening of said heating chamber to cool said insulated rotor conductors;
 a conditioning module located downstream from said bonding module, said conditioning module comprising:
  a conditioning chamber enclosing a second cooling device for further cooling said insulated rotor conductors to a predetermined maximum temperature;
  an infeed opening formed in a side of said conditioning chamber and aligned with said exit opening of said heating chamber; and
  an exit opening formed in a side of said conditioning chamber opposite and aligned with said infeed opening of said conditioning chamber.

13. The apparatus of claim 12, further comprising a collection module located downstream from said conditioning module in said process direction for receiving said insulated rotor conductors from said conditioning module, said collection module including a collection reservoir for receiving a plurality of said insulated rotor conductors in vertically stacked relation.

\* \* \* \* \*